United States Patent
Dawe et al.

(10) Patent No.: US 6,785,025 B1
(45) Date of Patent: Aug. 31, 2004

(54) COLLAGE MAKING APPARATUS AND METHOD FOR MAKING A COLLAGE

(75) Inventors: Julie Dawe, Fort Collins, CO (US); Michael L. Rudd, Fort Collins, CO (US); Jerlyn R. Culp, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 09/696,719

(22) Filed: Oct. 24, 2000

(51) Int. Cl.[7] ................................................. H04N 1/04
(52) U.S. Cl. ..................... 358/474; 358/487; 358/492; 358/496; 358/498
(58) Field of Search ............................... 358/474, 487, 358/498, 492, 496

(56) References Cited

U.S. PATENT DOCUMENTS

| | | | | |
|---|---|---|---|---|
| 5,926,289 A | * | 7/1999 | Brandestini et al. | ........ 358/487 |
| 6,043,866 A | * | 3/2000 | Kawai et al. | .................. 355/75 |
| 6,271,939 B1 | * | 8/2001 | Hu et al. | ..................... 358/497 |
| 6,384,941 B1 | * | 5/2002 | Ryu | ........................... 358/474 |

* cited by examiner

*Primary Examiner*—Edward Coles
*Assistant Examiner*—Houshang Safaipour (57) ABSTRACT

Collage making apparatus for assisting in the production of a collage by duplication apparatus may comprise a layout area contained within the collage making apparatus. The layout area accommodates at least one object that is to be contained in the collage. The collage making apparatus is convertible between a layout mode and a duplication mode. During the layout mode, the layout area is observable by a user so that the user may observe an arrangement of the at least one object within the layout area. During the duplication mode, the layout area is reproducible by the duplication apparatus so that the duplication apparatus produces a copy of the arrangement of the at least one object within the layout area.

6 Claims, 8 Drawing Sheets

COLLAGE MAKING APPARATUS AND METHOD FOR MAKING A COLLAGE

FIELD OF INVENTION

This invention relates to duplication devices in general and more specifically to flatbed scanner devices.

BACKGROUND

Scanner devices, such as flatbed scanners, are well-known in the art and produce machine-readable image data signals that are representative of a scanned object, such as a photograph or a page of printed text. In a typical scanner application, the image data signals produced by a flat bed scanner 11 (FIG. 1) may be used by a personal computer (not shown) to reproduce an image of the scanned object on a suitable display device (not shown), such as CRT or a printer.

The typical flatbed scanner 11 will be provided with a scanner housing 13 suitable for holding the various systems and components comprising the flatbed scanner 11. See FIG. 1. The scanner housing 13 may comprise a generally rectangularly shaped structure having a top side 15 and a bottom side 17 that are positioned in a generally parallel, spaced-apart relation to one another. The top side 15 of scanner housing 13 may include a generally rectangularly shaped scanning bed or transparent platen 19 that has a width 25 and a length 27. The scanning bed 19 allows an object positioned adjacent the scanning bed 19 to be scanned by a scanning device (not shown) contained within the housing 13.

Figure 1:
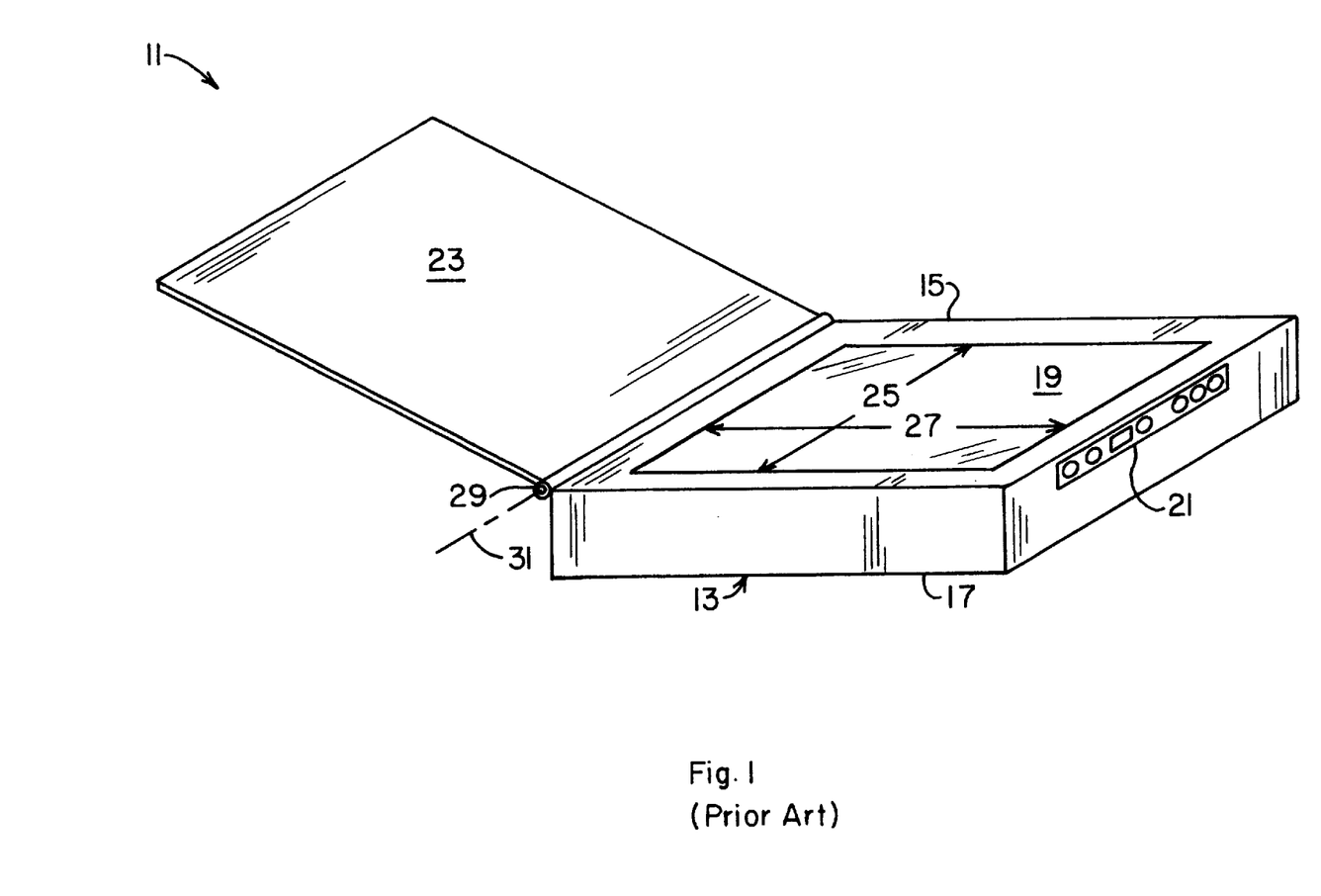
FIG. 1 is a perspective view of a flatbed scanner.

The scanner housing 13 may be further provided with a control panel 21 operatively associated with the flatbed scanner 11. A scanner lid 23 may be pivotally attached to the housing 13 via a hinge member 29. The hinge member 29 allows the scanner lid 23 to rotate about a pivot axis 31 between its opened position and its closed position.

The flatbed scanner 11 may further include illumination and optical systems (not shown) positioned within the housing 13 underneath the scanning bed 19. The illumination and optical systems accomplish the scanning of the object. More specifically, the illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector (not shown) positioned within the scanner housing 13. Image data representative of the entire object then may be obtained by sweeping the scan line across the entire object, usually by moving the illumination and optical systems with respect to the object.

By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" (CIS) may be used to collect and focus light from the illuminated scan region on the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

Flatbed scanners and the various components thereof are disclosed in U.S. Pat. No. 6,040,572 for NOTEBOOK STYLED SCANNER of Khovaylo, et al.; U.S. Pat. No. 4,926,041 for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; U.S. Pat. No. 4,870,268 for COLOR COMBINER AND SEPARATOR AND IMPLEMENTATIONS of Kent J. Vincent and Hans D. Neuman; U.S. Pat. No. 5,038,028 for OPTICAL SCANNER APERTURE AND LIGHT SOURCE ASSEMBLY of Boyd, et al.; and U.S. Pat. No. 5,227,620 for APPARATUS FOR ASSEMBLING COMPONENTS OF COLOR OPTICAL SCANNERS of Elder, et al., which are each hereby specifically incorporated by reference for all that is disclosed therein.

As personal computers and their peripheral devices continue to decrease in price while increasing in quality, more users find themselves with home computer systems that include scanners and high-quality color printers. Although many of the users have been informed of the ease with which creative tasks can be performed with such high-tech devices, many creative tasks are far too complex for the average user to successfully complete and enjoy. For example, many problems surface when a user wants to creatively combine multiple pieces of media into a collage or scrapbook. When dealing with such creative combinations, extensive computer-based editing of the scanned image is often required that quickly turns a creative endeavor into a tedious task.

As just mentioned, a common use for scanners is to "collage" several items into one cohesive, creative arrangement. With current flatbed scanners 11, the objects to be scanned must be laid upside down on the scanning bed 19, which makes it very difficult and impractical for the user to determine how the resulting collage will look. Typically, the user will place the objects face-down in a certain arrangement on the scanning bed 19. The user will then peel back an edge of each object to check the alignment of that object with respect to the scanning bed 19. The user will next scan the arrangement. Unfortunately, because it is difficult to confirm correct alignment of the objects while looking at the objects upside down, the first scan is often unsatisfactory. Thus, the user is forced to reposition the objects and perform another scan. Although this time-consuming process may eventually yield good results, it usually does so only after several repeated attempts by the user. In the meantime, the user may have wasted considerable time and processing capacity (associated with scanning and displaying the scanned image) before the desired arrangement has been scanned. Such a "scan, evaluate, reposition, re-scan, re-evaluate" process often results in the user being completely frustrated and disappointed. Moreover, even if the user is able to successfully position the objects on the scanning bed 19 in the desired arrangement prior to scanning, the closing of the scanner lid 23 may cause the objects to shift from that desired arrangement resulting in an unsatisfactory scan anyway.

Partly in an effort to alleviate the aforementioned problems some users have turned to digital cameras to capture electronic images of the desired arrangements. While such digital cameras allow the user to more easily obtain a scan or photograph of the objects in a desired arrangement since the objects can be arranged face-up, this solution first requires the user to obtain a digital camera, a costly endeavor.

Consequently, a need remains for collage making apparatus for use with scanner apparatus that improves user efficiency, success rate and satisfaction. Ideally, the collage making apparatus would be easy to use and not require any hardware changes. The collage making apparatus should allow the user to observe the arrangement of the objects prior to scanning so that the need to repeatedly scan, evaluate and position the objects to scan the desired layout is eliminated. Finally, the collage making apparatus should minimize the amount of time required for computer-based editing of the scanned image.

SUMMARY OF THE INVENTION

Collage making apparatus for assisting in the production of a collage by duplication apparatus may comprise a layout area contained within the collage making apparatus. The layout area accommodates at least one object that is to be contained in the collage. The collage making apparatus is convertible between a layout mode and a duplication mode. During the layout mode, the layout area is observable by a user so that the user may observe an arrangement of the at least one object within the layout area. During the duplication mode, the layout area is reproducible by the duplication apparatus so that the duplication apparatus produces a copy of the arrangement of the at least one object within the layout area.

Also disclosed is a method for making a collage that comprises the steps of: providing a collage making apparatus that defines a layout area; positioning at least one object within the layout area defined by the collage making apparatus; observing an arrangement of the at least one object within the layout area; positioning the collage making apparatus so that the layout area is adjacent a duplicating bed of a duplication apparatus; and operating the duplication apparatus to duplicate the arrangement of the at least one object within the layout area and to produce a copy of the arrangement of the at least one object within the layout area.

BRIEF DESCRIPTION OF THE INVENTION

Illustrative and presently preferred embodiments of the invention are shown in the accompanying drawing in which.

DETAILED DESCRIPTION OF THE INVENTION

Figure 2:
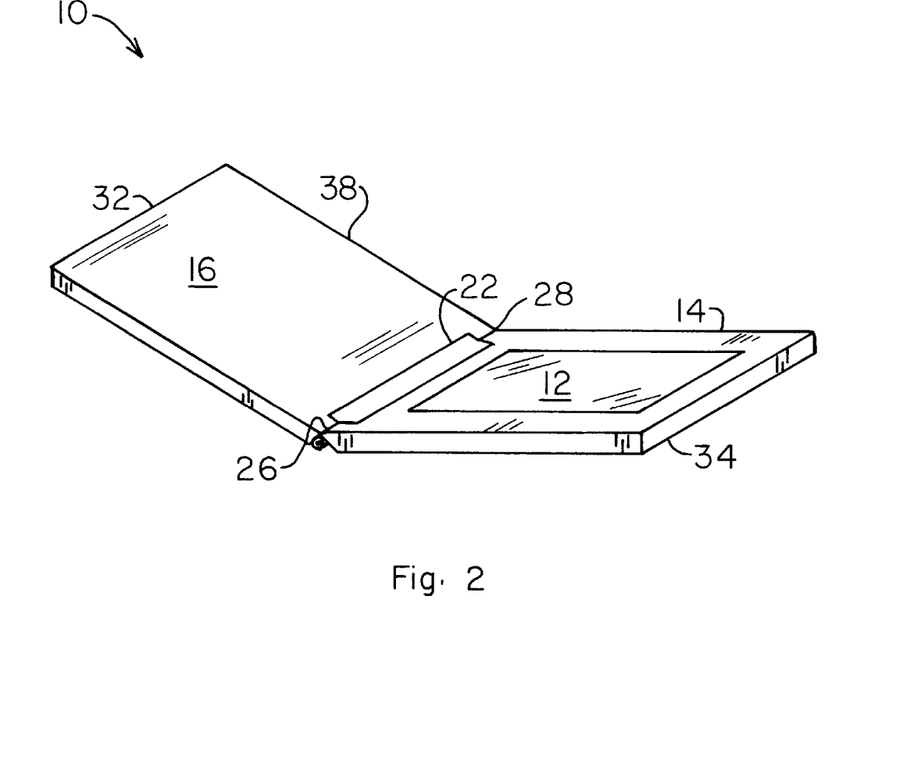
FIG. 2 is a perspective view of the collage making apparatus according to one embodiment of the present invention.

A collage making apparatus 10 according to one preferred embodiment of the present invention is shown in FIG. 2 and described herein as it could be used in conjunction with a flatbed scanner 11 (FIG. 1) to create a collage (not shown). Alternatively, and as will be explained in greater detail below, the collage making apparatus 10 may be used in conjunction with any of a wide range of other duplication devices such as photo copiers, cameras, or other types of duplication systems. The collage making apparatus 10 may also be used to produce documents and things besides collages.

The collage making apparatus 10 may comprise a layout area 12 contained within the collage making apparatus 10 that accommodates at least one object (not shown), such as a photograph, drawing, written text, etc. (not shown), that is to be contained in the collage. The collage making apparatus 10 is designed such that it is convertible between a layout mode (shown in FIGS. 2 and 3) and a scan mode (FIG. 4). During the layout mode, the user (not shown) is able to position the object within the layout area 12 and then observe the arrangement (not shown) prior to scanning to ensure a proper arrangement. Since the user is able to see how the collage will eventually look prior to scanning, there is no need to repeatedly scan, evaluate and reposition the object to scan a desired arrangement. During the scan mode, the collage making apparatus 10 is positioned on the scanning bed 19 of scanner 11 so that the layout area 12 is scannable by the flatbed scanner 11. The scanner 11 may then be operated to scan the layout area 12, thus capturing an electronic image of the arrangement of the object within the layout area 12.

The collage making apparatus 10 may further comprise a backing member 14 that defines the layout area 12 and a transparent cover member 16 that is operatively associated with the backing member 14. The transparent cover member 16 may be movable between a first position 38 (FIGS. 2 and 3) and a second position 40 (FIG. 4). In the first position 38, the transparent cover member 16 exposes the layout area 12. In the second position 40, the transparent cover member 16 covers the layout area 12 and also secures any objects contained within the layout area 12.

The collage making apparatus 10 may be used as follows to create a collage with a flatbed scanner 11. Assuming that the user has selected the object or objects (not shown) that are to be contained in the collage, the user moves the transparent cover member 16 to its first position 38 (or removes the transparent cover member 16) and places the object or objects within the layout area 12 defined by the backing member 14. The user then moves the transparent cover member 16 to its second position 40 thereby enclosing and securing the object(s) within the layout area 12. The user may then observe the arrangement of the object(s) within the layout area 12 through the transparent cover member 16 to ensure a proper arrangement. If satisfied, the user positions the collage making apparatus 10 so that the transparent cover member 16 is face-down on the scanning bed 19 of flatbed scanner 11. The user next actuates the flatbed scanner 11 so that the flatbed scanner 11 scans the arrangement of the object(s) within the layout area 12 through the transparent cover member 16. The flatbed scanner 11 then sends image data signals that are representative of the arrangement of the object(s) within the layout area 12 to a computer (not shown) operatively associated with the flatbed scanner 11. The computer then reproduces an image (not shown) of the arrangement of the object(s) within the layout area 12 on a suitable display device (not shown), such as CRT or a printer.

A significant advantage of the present invention is that it allows a user to observe an arrangement of an object within the layout area 12 prior to scanning the object. Since the user is able to see how the collage will eventually look prior to scanning, the need to repeatedly scan, evaluate and reposition the object to scan a desired arrangement is eliminated. Thus, the time needed for the user to scan a desired arrangement is minimized. In addition, the user's frustration associated with the repeated scanning, evaluating and repositioning process is eliminated.

Another significant advantage of the present invention is that the it improves collage making without requiring any hardware changes. Indeed, the collage making apparatus 10 is easy to use since it utilizes common methods and has the flexibility to be used in conjunction with any duplication devices that are capable of producing a duplicate such as photocopiers, cameras and the like.

Yet another significant advantage of the present invention is that the collage making apparatus 10 secures the object within the layout area 12. Therefore, the closing of the scanner lid 23 will not disturb the arrangement of any objects within the layout area 12.

Still yet another significant advantage of the present invention is that the layout area 12 of the collage making apparatus 10 can assist the user in placing the object by providing the appropriate position and orientation for the object within the layout area 12. By doing so, the resulting scanned image will need little to no computer-based editing. Thus, the time needed to create a collage with the flatbed scanner 11 is minimized.

Having briefly described the collage making apparatus 10 according to one embodiment of the present invention, as well as some of its more significant features and advantages, the various preferred embodiments of the collage making apparatus will now be described in detail. However, before proceeding with the description, it should be noted that while the three alternative embodiments 10, 110, 210 of the collage making apparatus are shown and described herein as they could be used in conjunction with flatbed scanners 11, 111, 211 to create a collage, they could also be used in any of wide range of other applications and in conjunction with any of a wide range of other duplication apparatus such as other scanner apparatus, copier apparatus, cameras, and the like. Indeed, the collage making apparatus 10, 110, 210 could be used in conjunction with any duplication devices, that are now known in the art or that may be developed in the future, capable of producing a duplicate or copy of an object. For instance, the collage making apparatus 10, 110, 210 could be used with a photocopying machine to create a scrapbook. Consequently, the present invention should not be regarded as limited to use in conjunction with flatbed scanners only nor should it be regarded as limited to the production of collages only.

With the foregoing considerations in mind, one preferred embodiment of the collage making apparatus 10 according to the present invention is shown in FIG. 2 and is described herein as it could be used in conjunction with a flatbed scanner 11 of the type that is readily commercially available. Since flatbed scanners are well-known in the art, however, and could readily be provided by persons having ordinary skill in the art after having become familiar with the teachings of the present invention, the various component parts of the flatbed scanners 11, 111 (FIG. 7), and 211 (FIG. 8) will not be discussed in further detail herein.

As briefly mentioned earlier, the collage making apparatus 10 may comprise a layout area 12 contained within the collage making apparatus 10 which accommodates at least one object that is to be contained in a collage. The collage making apparatus 10 may be configured such that it is convertible between a layout mode (FIGS. 2 and 3) and a scan mode (FIG. 4). During the layout mode, the user is able to position the object within the layout area 12 and then observe that arrangement prior to scanning to ensure a proper arrangement. Since the user is able to see how the collage will eventually look prior to scanning, the need to repeatedly scan, evaluate and reposition the object to scan a desired arrangement is eliminated. During the scan mode, the layout area 12 is scannable by the flatbed scanner 11 such that the arrangement of the object within the layout area 12 is scanned by the flatbed scanner 11.

The layout area 12 may include fasteners (not shown) for mounting objects within the layout area 12. Any such fasteners may be selected from any of a wide range of fastening devices or systems (e.g., clips or adhesives) that would be suitable for the intended application. By way of example, a double-sided adhesive tape may be used to mount an object within the layout area 12. In another embodiment, a tacky surface may be provided within the layout area 12 so that an object may be mounted within the layout area 12. In yet another embodiment, the layout area 12 may be provided with corner mounting inserts sized to receive the corners of an object so that an object may be mounted within the layout area 12. In still yet another embodiment, glue may be used to mount an object within the layout area 12. In still another arrangement, hook and loop fasteners (e.g., Velcro®) may be used to mount an object within the layout area 12. In the embodiment shown and described herein, a transparent cover member 16 secures any objects contained within the layout area 12 when the transparent cover member 16 is in its second position 40 (FIG. 4).

Although it is not required, the collage making apparatus 10 may be provided with designs or patterns (not shown). By way of example only, the backing member 14 of collage making apparatus 10 may be provided with a school bus design in which the layout area 12 is aligned with a window of the school bus such that in the resulting image displayed by the computer, the object appears in the school bus window.

Figure 3:
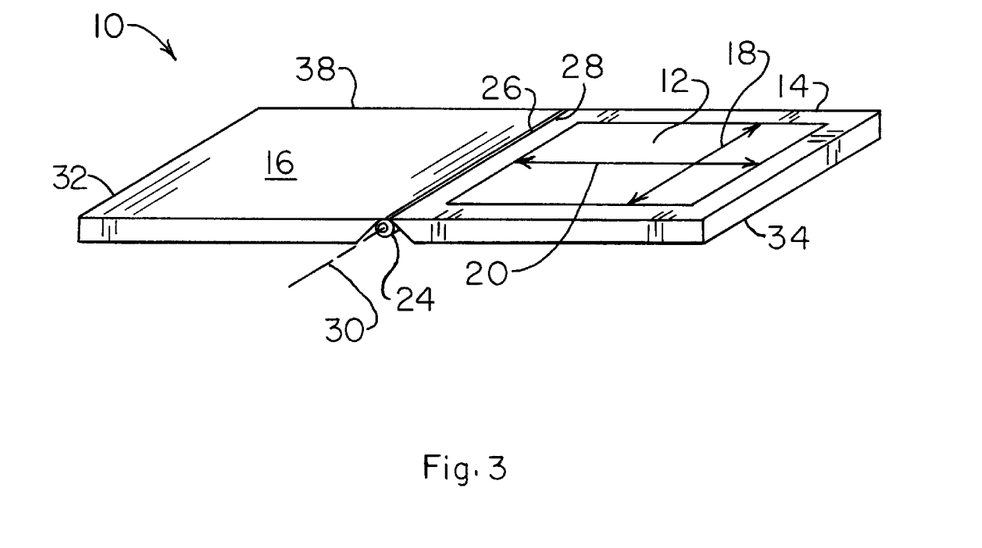
FIG. 3 is another perspective view of the collage making apparatus showing a fully articulating hinge member.
Figure 4:
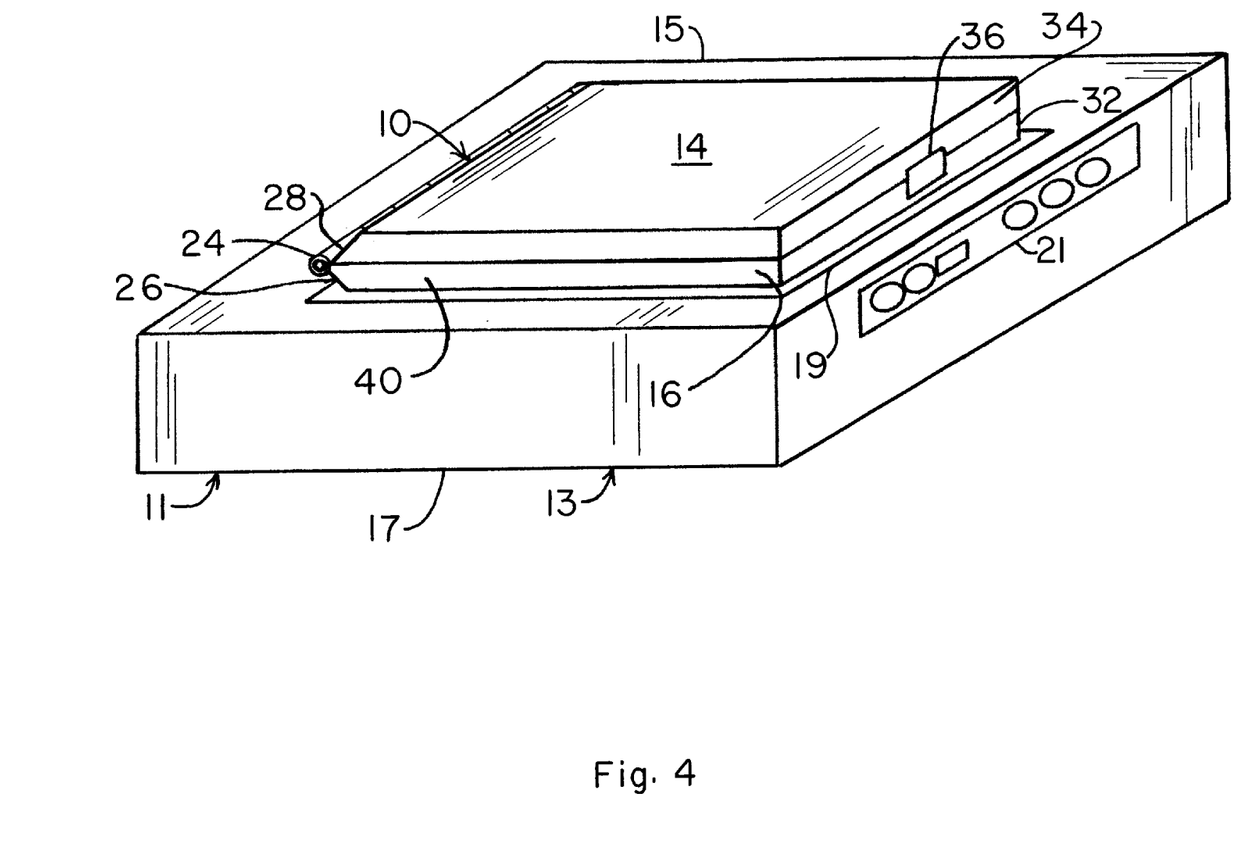
FIG. 4 is another perspective view of the collage making apparatus with the scanner lid removed to show the transparent cover member in its second position and positioned adjacent the scanning bed of the flatbed scanner.

With reference now primarily to FIGS. 2, 3 and 4, the layout area 12 of the collage making apparatus 10 may be defined by a backing member 14. In the embodiment shown and described herein, the layout area 12 comprises a generally rectangular shape having a width 18 and length 20 (FIG. 3) about equal to the width 25 and length 27 (FIG. 1), respectively, of the scanning bed 19, although other shapes and configurations are possible. The backing member 14 may comprise any of a wide range of materials (e.g., plastics, metals, glass, cardboard) suitable for the intended application. In one preferred embodiment, the backing member 14 comprises a plate glass member, although other shapes, materials, and configurations may be used. Alternatively, the backing member 14 may be made from cardboard. In yet another alternative embodiment, the backing member 14 is made from plastic.

The collage making apparatus 10 may further include a transparent cover member 16 that is operatively associated with the backing member 14 so that the transparent cover member 16 is movable between a first position 38 (FIGS. 2 and 3) and a second position 40 (FIG. 4). In the first position 38, the transparent cover member 16 exposes the layout area 12. In the second position 40, the transparent cover member 16 covers the layout area 12 and also secures any objects that are contained within the layout area 12. The transparent cover member 16 may comprise any of a wide range of transparent, plate-like materials suitable for the intended application. In one preferred embodiment, the transparent cover member 16 is made from glass. Alternatively, the transparent cover member 16 may be made from transparent plastic.

It is generally preferred, but not required, that the transparent cover member 16 be attached to the backing member 14. Any of a wide range of suitable fastening devices or systems (e.g., by mechanical fasteners or adhesives) may be used to attach the transparent cover member 16 to the backing member 14. By way of example, an adhesive tape 22 (FIG. 2) may be used to attach a first edge 26 of transparent cover member 16 to a first edge 28 of backing member 14. In another embodiment, the transparent cover member 16 may be pivotally attached to the backing member 14 via a hinge member 24 (FIGS. 3 and 4). More specifically, the hinge member 24 may be attached to the first edge 26 of transparent cover member 16 and to the first edge 28 of backing member 14. The hinge member 24 allows the transparent cover member 16 to be pivoted with respect to the backing member 14. Stated differently, the transparent cover member 16 may be pivoted between its first and second positions 38, 40 about pivot axis 30. It is generally preferred, but not required, that the hinge member 24 be fully articulating so that the user can lay both the backing member 14 and the transparent cover member 16 flat against a surface during the layout mode (FIG. 3).

It is also generally preferred, but not required, that a second edge 32 of transparent cover member 16 engage a second edge 34 of backing member 14 when the transparent cover member 16 is in its second position 40 (FIG. 4). A fastener 36 selected from any of a wide range of fastening systems or devices (e.g., screws, rivets, adhesives, formed tabs and hooks, brackets, etc.), suitable for the intended application, may be used to secure the second edge 32 of transparent cover member 16 to the second edge 34 of backing member 14. In the embodiment shown and described herein, an adhesive tape 36 (FIG. 4) is used to secure the second edge 32 of transparent cover member 16 to the second edge 34 of backing member 14 after the transparent cover member 16 is moved to its second position 40, although such is not required.

The collage making apparatus 10 according to this first embodiment of the present invention may be used as follows to create a collage with a flatbed scanner 11. Assuming that the user has selected the object or objects that are to be contained in the collage, the user moves the transparent cover member 16 to its first position 38 (FIGS. 2 and 3) and places the object or objects within the layout area 12 defined by the backing member 14. The user then moves the transparent cover member 16 to its second position 40 (FIG. 4) and engages the second edge 32 of transparent cover member 16 with the second edge 34 of backing member 14 thus enclosing and securing the object or objects within the layout area 12. The user may then observe the arrangement of the object(s) within the layout area 12 through the transparent cover member 16 to ensure a proper arrangement. If satisfied, the user positions the collage making apparatus 10 so that the transparent cover member 16 is face-down on the scanning bed 19. The user next actuates the flatbed scanner 11 so that the flatbed scanner 11 scans the arrangement of the object(s) within the layout area 12 through the transparent cover member 16. The flatbed scanner 11 then sends image data signals that are representative of the arrangement of the object(s) within the layout area 12 to a computer operatively associated with the flatbed scanner 11. The computer then reproduces an image of the arrangement of the object(s) within the layout area 12 on a suitable display device, such as CRT or a printer.

Figure 5:
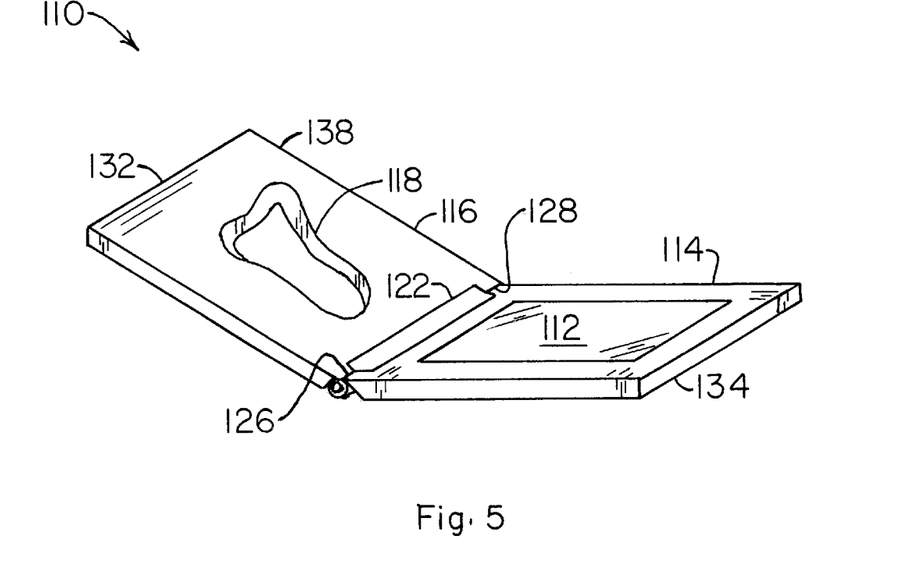
FIG. 5 is a perspective view of a second embodiment of the collage making apparatus.
Figure 6:
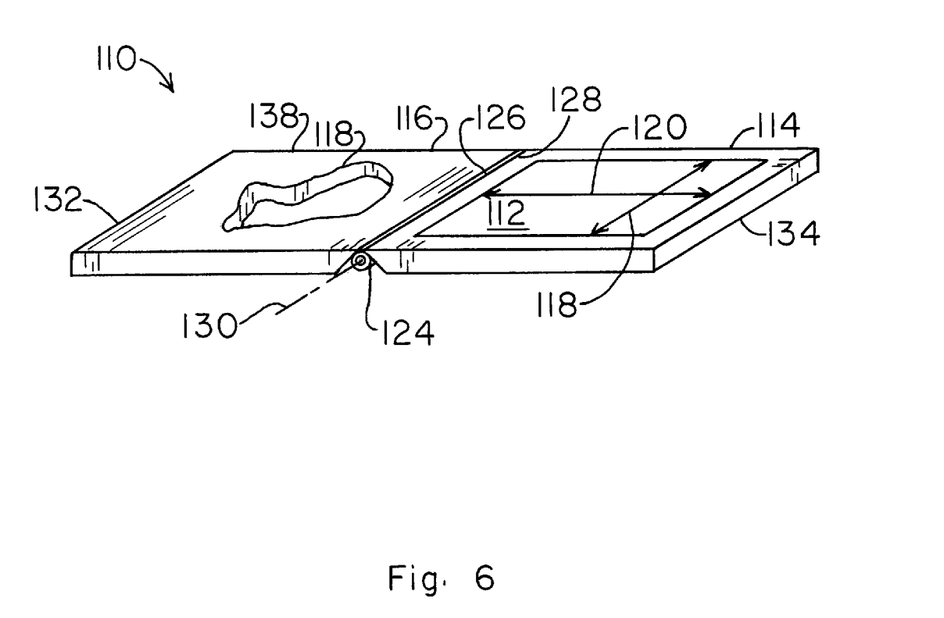
FIG. 6 is another perspective view of the second embodiment of the collage making apparatus showing a fully articulating hinge member.
Figure 7:
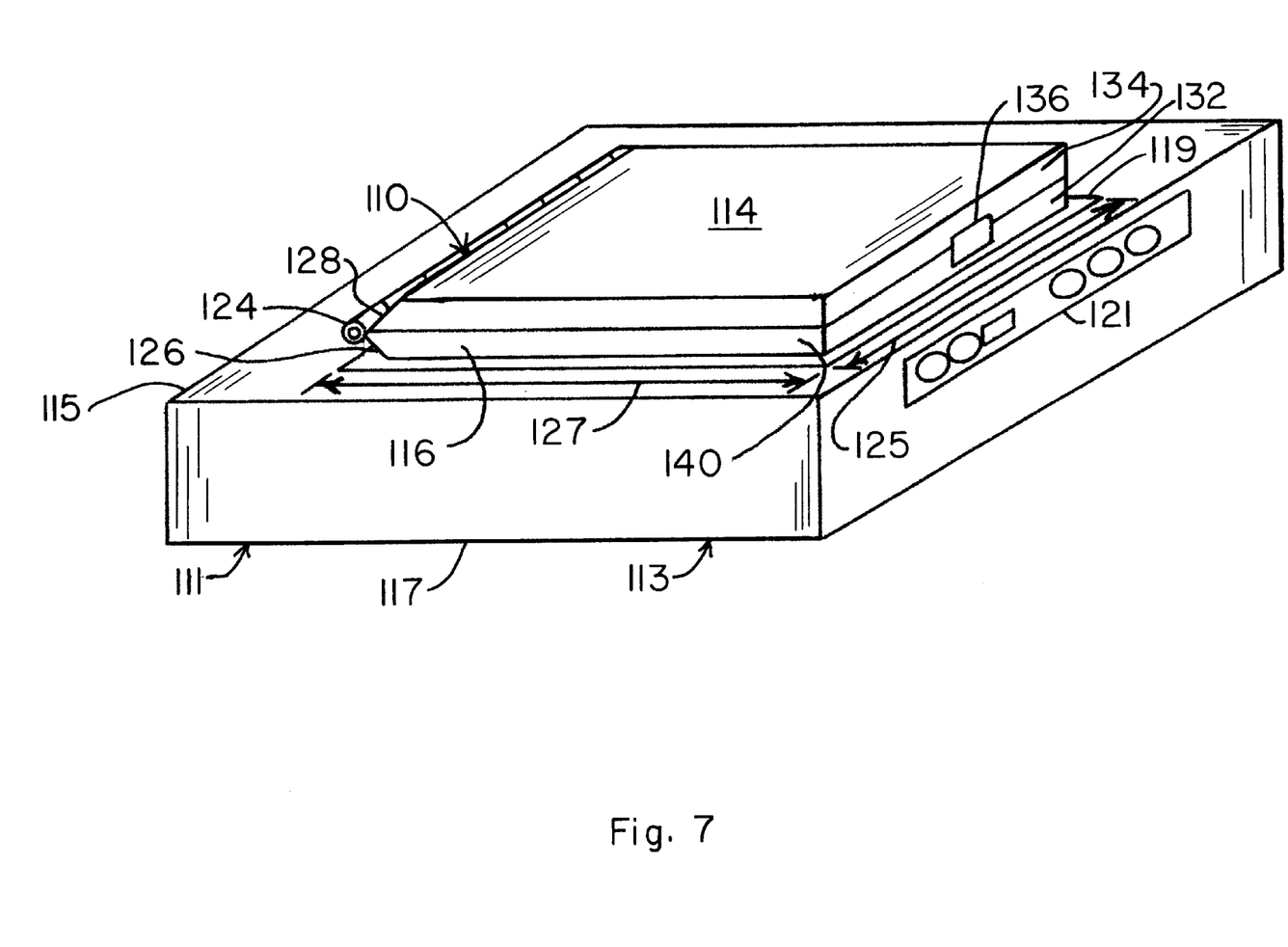
FIG. 7 is another perspective view of the second embodiment of the collage making apparatus with the scanner lid removed to show the template member in the second position and positioned adjacent the scanning bed of the flatbed scanner.

A second embodiment 110 of the collage making apparatus is shown in FIGS. 5, 6 and 7. In this second alternative embodiment 110, a backing member 114 may be provided that defines a layout area 112. In the embodiment shown and described herein, the backing member 114 defines a layout area 112 that is generally rectangularly shaped with a width 118 and length 120 (FIG. 6) about equal to the width 125 and length 127 (FIG. 7), respectively, of the scanning bed 119, although other shapes and configurations may be used.

The layout area 112 may include fasteners (not shown) for mounting objects within the layout area 112. Any such fasteners may be selected from any of a wide range of fastening devices or systems (e.g., clips or adhesives) that would be suitable for the intended application. By way of example, a double-sided adhesive tape may be used to mount an object within the layout area 112. In another embodiment, a tacky surface may be provided within the layout area 112 so that an object may be mounted within the layout area 112. In yet another embodiment, the layout area 112 may be provided with corner mounting inserts sized to receive the corners of an object so that an object may be mounted within the layout area 112. In still yet another embodiment, glue may be used to mount an object within the layout area 112. In still another arrangement, hook and loop fasteners (e.g., Velcro®) may be used to mount an object within the layout area 112. In the embodiment shown and described herein, a template member 116 secures any objects contained within the layout area 112 when the template member 116 is in its second position 140 (FIG. 7).

The backing member 114 may comprise any of a wide range of materials (e.g., plastics, metals, glasses, cardboard) suitable for the intended application. In one preferred embodiment, the backing member 114 comprises a plate glass member, although other shapes, materials, and configurations may be used. Alternatively, the backing member 114 may be made from cardboard. In yet another alternative embodiment, the backing member 114 is made from plastic.

The collage apparatus 110 may further include a template member 116 that is operatively associated with the backing member 114 so that the template member 116 is movable between a first position 138 (FIGS. 5 and 6) and a second position 140 (FIG. 7). The template member 116 may include at least one opening 118 therein. In the first position 138, the template member 116 exposes the layout area 112. In the second position 140, the template member 116 covers a portion of the layout area 112 while the opening 118 exposes a portion of any objects contained within the layout area 112. The template member 116 may also secure any objects contained within the layout area 112 when the template member 116 is in its second position 140.

The template member 116 may comprise any of a wide range of materials and shapes suitable for the intended application. It is generally preferred, but not required, that the template member 116 comprise an opaque or translucent, plate-like member. By way of example only, in one preferred embodiment, the template member 116 is made from tinted plastic. Alternatively, the template member 116 may be made from cardboard.

It is generally preferred, but not required, that the template member 116 be provided with a design or pattern (not shown) around the opening 118. By way of example only, the template member 116 may be provided with a school bus design in which the opening 118 forms a school bus window such that in the resulting image displayed by the computer, the portion of the object exposed by the opening 118 appears in the school bus window.

It is generally preferred, but not required, that the template member 116 be attached to the backing member 114. Any of wide range of suitable fastening devices or systems (e.g., by mechanical fasteners or adhesives) may be used to attach the template member 116 to the backing member 114. By way of example, an adhesive tape 122 (FIG. 5) is used to attach a first edge 126 of template member 116 to a first edge 128 of backing member 114. In another embodiment, the template member 116 may be pivotally attached to the backing member 114 via a hinge member 124 (FIGS. 6 and 7). More specifically, the hinge member 124 may be attached to the first edge 126 of template member 116 and to the first edge 128 of backing member 114. The hinge member 124 allows the template member 116 to be pivoted with respect to the backing member 114. Stated differently, the template member 116 may be pivoted between its first and second positions 138, 140 about pivot axis 130. It is generally preferred, but not required, that the hinge member 124 be fully articulating so that the user can lay both the backing member 114 and the template member 116 flat against a surface during the layout mode (FIG. 6).

It is also generally preferred, but not required, that a second edge 132 of template member 116 engage a second edge 134 of backing member 114 when the template member 116 is in its second position 140 (FIG. 7). A fastener 136 selected from any of a wide range of fastening systems or devices (e.g., screws, rivets, adhesives, formed tabs and hooks, brackets, etc.), suitable for the intended application, may be used to secure the second edge 132 of template member 116 to the second edge 134 of backing member 114. In the embodiment shown and described herein, an adhesive tape 136 (FIG. 7) is used to secure the second edge 132 of template member 116 to the second edge 134 of backing member 114 after the template member 116 is moved to its second position 140, although such is not required.

The collage making apparatus 110 according to this second embodiment of the present invention may be operated as follows to create a collage with a flatbed scanner 111. Assuming that the user has selected the object or objects that are to be contained in the collage, the user moves the template member 116 to its first position 138 (or removes the template member 116) and places the object or objects within the layout area 112 defined by the backing member 114. The user then moves the template member 116 to its second position 140 and engages the second edge 132 of template member 116 with the second edge 134 of backing member 114. The user may then observe the portion(s) of the object(s) exposed through the opening 118 to ensure a proper arrangement. If satisfied, the user positions the collage making apparatus 110 so that template member 116 is face-down on the scanning bed 119. The user next actuates the flatbed scanner 111 so that the flatbed scanner 111 scans the template member 116 and the portion(s) of the object(s) exposed by the opening 118. The flatbed scanner 111 then sends image data signals that are representative of the scanned template member 116 and object portion(s) exposed by the opening 118 to a computer (not shown) operatively associated with the flatbed scanner 111. The computer then reproduces an image from those image data signals on a suitable display device.

Figure 8:
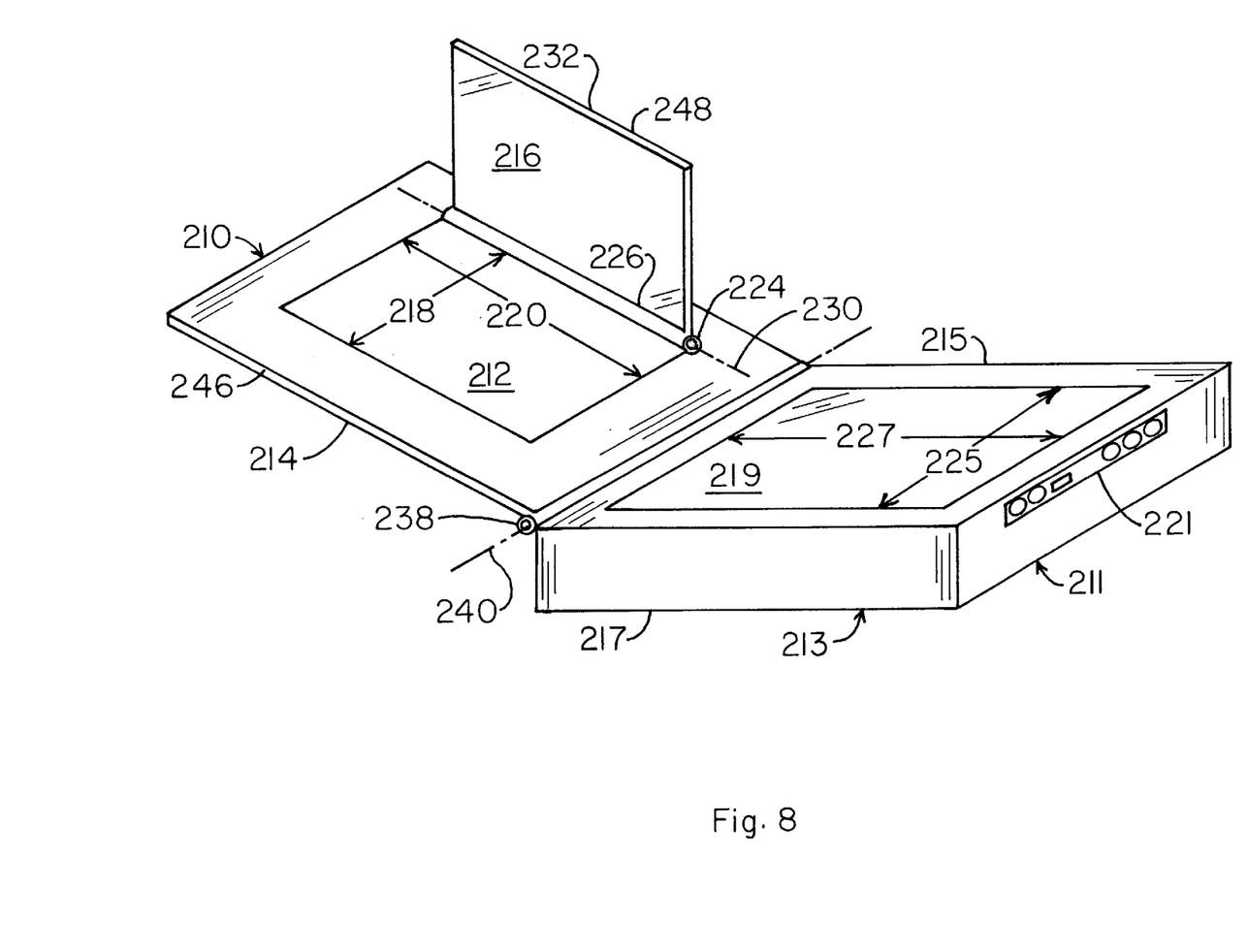
FIG. 8 is a perspective view of a third embodiment of the collage making apparatus.
Figure 9:
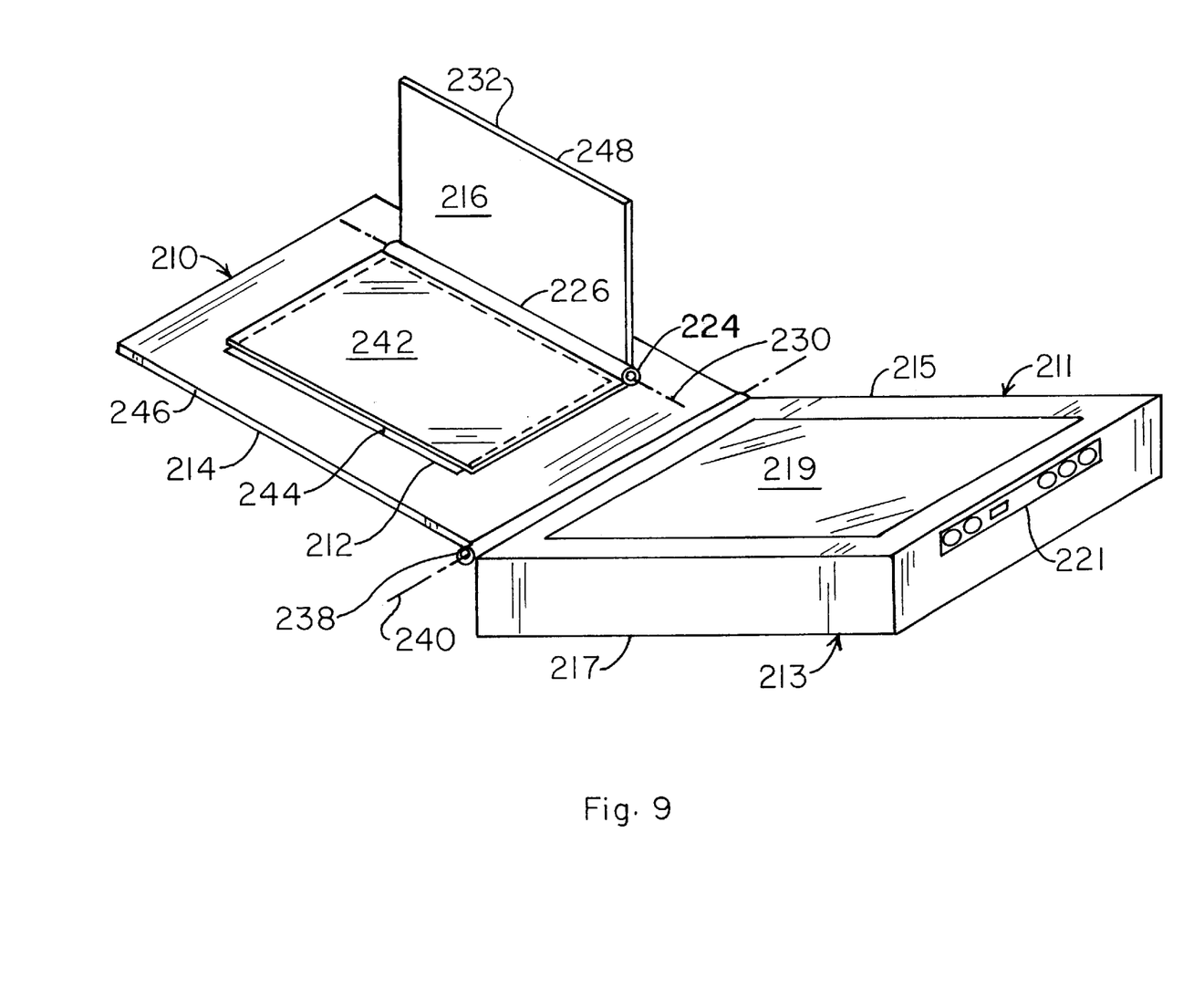
FIG. 9 is a perspective view of the third embodiment of the collage making apparatus having a transparent backing member.
Figure 10:
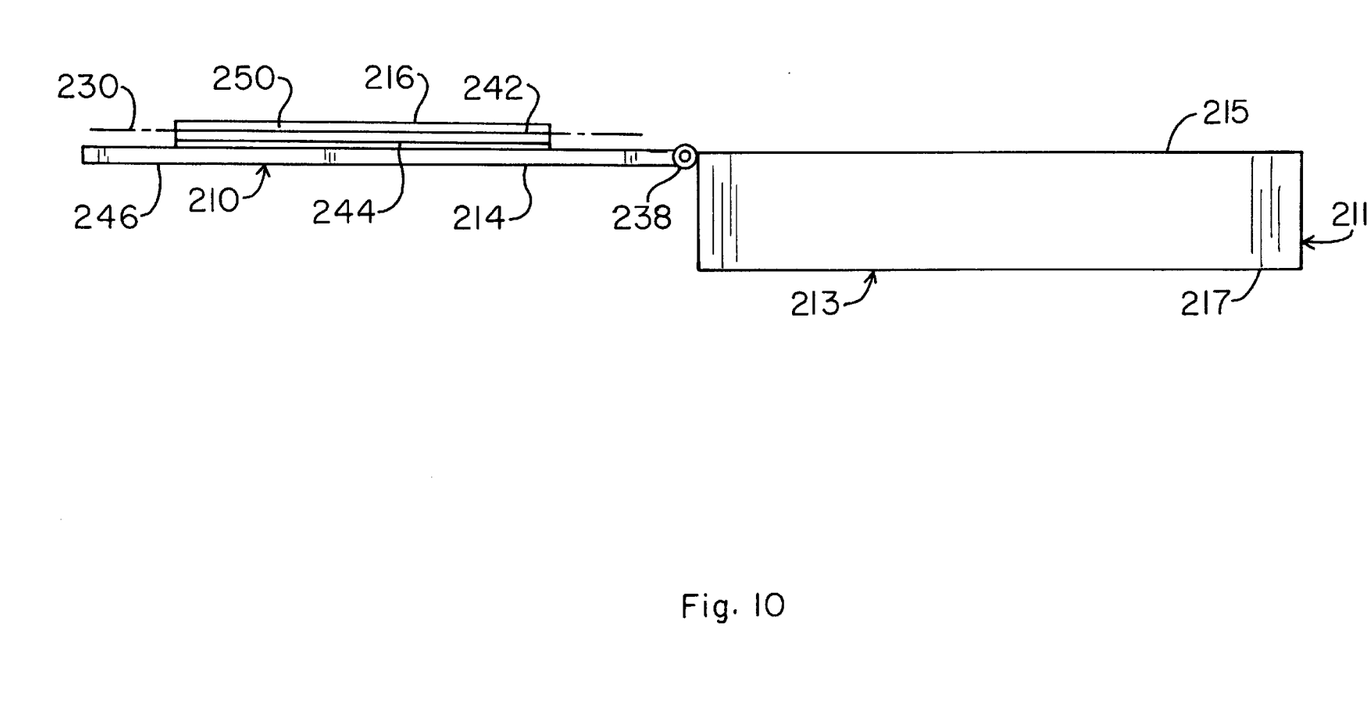
FIG. 10 is a side view of the third embodiment of the collage making apparatus showing the fully articulating hinge members and the space defined between the transparent backing member and the scanner lid.

A third alternative embodiment 210 of the collage making apparatus according to the present invention is shown in FIGS. 8, 9 and 10, and may include a scanner lid 214 that is operatively associated with the flatbed scanner 211 so that the scanner lid 214 is movable between an opened position 246 (FIGS. 8, 9 and 10) and a closed position (not shown), but discussed below. In this alternative embodiment 210, the scanner lid 214 defines a layout area 212. The layout area 212 may be a generally rectangular shape having a width 218 and length 220 (FIG. 8) about equal to the width 225 and length 227 (FIG. 8), respectively, of the scanning bed 219, although other shapes and configurations may be used.

The layout area 212 may include fasteners (not shown) for mounting objects within the layout area 212. Any such fasteners may be selected from any of a wide range of fastening devices or systems (e.g., clips or adhesives) that would be suitable for the intended application. By way of example, a double-sided adhesive tape may be used to mount an object within the layout area 212. In another embodiment, a tacky surface may be provided within the layout area 212 so that an object may be mounted within the layout area 212. In yet another embodiment, the layout area 212 may be provided with corner mounting inserts sized to receive the corners of an object so that an object may be mounted within the layout area 212. In still yet another embodiment, glue may be used to mount an object within the layout area 212. In still another arrangement, hook and loop fasteners (e.g., Velcro®) may be used to mount an object within the layout area 212. In the embodiment shown and described herein, a transparent cover member 216 secures any objects contained within the layout area 212 when the transparent cover member 216 is in its second position 250 (FIG. 10).

In the embodiment shown and described herein, the scanner lid 214 comprises a generally rectangularly shaped structure. Alternatively, of course, other shapes and configurations are possible. The scanner lid 214 may be made from any of a wide range of materials (e.g., metals or plastics) suitable for the intended application. By way of example only, the scanner lid 214 is fabricated from an acrylonitrile butadiene styrene (ABS) plastic, although other materials may be used.

It is generally preferred, but not required, that the scanner lid 214 be attached to the scanner housing 213 of flatbed scanner 211. The scanner lid 214 may be attached to the scanner housing 213 using any of a wide range of suitable fastening devices or systems (e.g., by mechanical fasteners or adhesives). By way of example, the scanner lid 214 is pivotally attached to the housing 213 via a hinge member 238 (FIGS. 8, 9 and 10). The hinge member 238 allows the scanner lid 214 to be pivoted with respect to the scanner housing 213. Stated differently, the scanner lid 214 may be pivoted between its opened position 246 (FIGS. 8, 9 and 10) and its closed position about pivot axis 240. It is generally preferred, but not required, that the hinge member 238 be fully articulating so that the user can lay the scanner lid 214 flat against a surface during the layout mode (FIG. 10).

The collage making apparatus 210 may further include a transparent cover member 216 operatively associated with the scanner lid 214 so that the transparent cover member 216 is movable between a first position 248 (FIGS. 8 and 9) and a second position 250 (FIG. 10). When the transparent cover member 216 is in its first position 248 and the scanner lid 214 is in its opened position 246, the layout area 212 is exposed (FIG. 8). The layout area 212 is covered, however, by the transparent cover member 216 when the transparent cover member 216 is in its second position 250 (FIG. 10). Any objects contained within the layout area 212 may be secured by the transparent cover member 216 when the transparent cover member 216 is in its second position 250, which allows the scanner lid 214 to be closed without disturbing the arrangement of any objects contained in the layout area 212.

In the embodiment shown and described herein, the transparent cover member 216 comprises a generally rectangular shape having a width and length about equal to the width 218 and length 220 (FIG. 8), respectively, of the layout area 212, although other shapes and configurations are possible. The transparent cover member 216 may comprise any of a wide range of transparent, plate-like materials suitable for the intended application. In one preferred embodiment, the transparent cover member 216 is made from transparent plastic, although other materials may be used. Alternatively, the transparent cover member 216 may comprise a plate glass member.

It is generally preferred, but not required, that the transparent cover member 216 be attached to the scanner lid 214. Any of a wide range of suitable fastening devices or systems (e.g., by mechanical fasteners or adhesives) may be used to attach the transparent cover member 216 to the scanner lid 214. By way of example only, in one preferred embodiment, the transparent cover member 216 is pivotally attached to the scanner lid 214 via a hinge member 224 (FIGS. 8 and 9). More specifically, the hinge member 224 pivotally attaches a first edge 226 of transparent cover member 216 to the scanner lid 214. The hinge member 224 allows the transparent cover member 216 to be pivoted with respect to the scanner lid 214. Stated differently, the transparent cover member 216 may be pivoted between its first and second positions 248, 250 about pivot axis 230. It is generally preferred, but not required, that the hinge member 224 be fully articulating so that the user can lay the transparent cover member 216 flat against a surface during the layout mode (FIG. 10). Alternatively, the transparent cover member 216 may be pivotally attached to the scanner lid 214 via the hinge member 238 (not shown).

It is also generally preferred, but not required, that a second edge 232 of transparent cover member 216 engage the scanner lid 214 when the transparent cover member 216 is in its second position 250 (not shown). By way of example only, a fastener (not shown) selected from any of a wide range of fastening systems or devices (e.g., screws, rivets, adhesives, formed tabs and hooks, brackets, etc.), suitable for the intended application, may be used to secure the second edge 232 of transparent cover member 216 to the scanner lid 214 after the transparent cover member 216 is moved to its second position 250.

As best seen in FIG. 9, the collage making apparatus 210 may be further provided with a transparent backing member 242 operatively associated with the scanner lid 214 so that a space or insert slot 244 is defined between the transparent backing member 242 and the scanner lid 214. The insert slot 244 allows a background motif (not shown) to be placed between the transparent backing member 242 and the scanner lid 214. In the embodiment shown and described herein, the insert slot 244 allows a background motif to be placed behind an object that is positioned between the transparent cover member 216 and the transparent backing member 242. An insert slot could also have been provided in the first and second embodiments 10 and 110 of the collage making apparatus as well (not shown).

The transparent backing member 242 may comprise any of a wide range of transparent, plate-like materials suitable for the intended application. In one preferred embodiment, the transparent backing member 242 is made from transparent plastic, although other materials may be used. Alternatively, the transparent backing member 242 may be made from glass.

It is generally preferred, but not required, that the transparent backing member 242 be attached to the scanner lid 214. Any of a wide range of suitable fastening devices or systems (e.g., by mechanical fasteners or adhesives) may be used to attach the transparent backing member 242 to the scanner lid 214. In a preferred embodiment, the transparent backing member 242 is secured to the scanner lid 214 by any of a wide range of suitable adhesives that are readily commercially available (FIG. 10). Alternatively, the transparent backing member 242 may be pivotally attached to the scanner lid 214 via a hinge member (not shown) which allows the transparent backing member 242 to be pivoted with respect to the scanner lid 214. The hinge member may comprise a fully articulating hinge member that would allow the user to lay the transparent backing member 242 flat against a surface during the layout mode (not shown). The transparent backing member 242 may also be secured by and engage the transparent cover member 216 when the transparent cover member 216 is in its second position 250 (not shown). In yet another alternative embodiment, the scanner lid 214 may be provided with an aperture (not shown) into which the transparent backing member 242 is mounted. Since the details of attaching the transparent backing member 242 to the scanner lid 214 are not necessary to understand or describe the present invention, the particular mounting arrangement utilized in one embodiment will not be described in further detail.

The collage making apparatus 210 of the third embodiment may be operated as follows to create a collage with a flatbed scanner 211. Assuming that the user has selected the object or objects that are to be contained in the collage, the user opens the scanner lid 214 and moves the transparent cover member 216 to its first position 248 (or removes the transparent cover member 216). The user next positions the object or objects within the layout area 212 defined by the scanner lid 214. The user then moves the transparent cover member 216 to its second position 250 and engages the second edge 232 of transparent cover member 216 with the scanner lid 214 thereby enclosing and securing the object(s) within the layout area 212. Optionally, the user may insert a background motif behind the object(s) via insert slot 244. The user may then observe the arrangement of the object(s) within the layout area 212 through the transparent cover member 216 to ensure a proper arrangement. If satisfied, the user closes the scanner lid 214 which positions the transparent cover member 216 face-down on the scanning bed 219. The user next actuates the flatbed scanner 211 so that the flatbed scanner 211 scans the arrangement of the object (s) within the layout area 212 and optional background motif through the transparent cover member 216. The flatbed scanner 211 then sends image data signals that are representative of the arrangement of the object(s) within the layout area 212 to a computer (not shown) operatively associated with the flatbed scanner 211. The computer then reproduces an image of the arrangement of the object(s) within the layout area 212 on a suitable display device.

In any of the three embodiments 10, 110, 210 of the collage making apparatus just discussed, a sticker (not shown) may be provided. The sticker may removably adhere to the collage making apparatus 10, 110, 210 so that the sticker is reusable and repositionable. Alternatively, the sticker may removably adhere to the scanning beds 19, 119, 219. The sticker may be provided in a variety of themes (i.e., stars, rainbows, etc.) to help add creativity to the collage. By way of example only, the sticker may comprise a thought balloon upon which text can be added and erased. By using the thought balloon sticker, text can be easily and quickly added to the collage. Although such text could be added to the electronic image of the arrangement of the object(s) within the layout areas 12, 112, 212 with a computer operatively associated with the flatbed scanners 11, 111, 211, the computer method often proves much more difficult for the average user than just assembling stickers on the scanning beds 19, 119, 219 or on the collage making apparatus 10, 110, 210 prior to scanning.

The collage making apparatus 10, 110, 210 may also be provided with a paper sheet (not shown) having a first side and a second side. The paper sheet is to be contained in the printer operatively associated with the flatbed scanners 11, 111, 211. The first side of the paper sheet may have a background motif (not shown) preprinted thereon such that the printer prints out the computer produced image of the arrangement of the object(s) within the layout area 12, 112, 212 overlaying the background motif. Stated differently, since the background motif is already provided on the paper sheet, the flatbed scanners 11, 111, 211 do not scan the background motif nor is it produced by the computer or printer.

The collage making apparatus 10, 110, 210 may also comprise a background pattern (not shown) selected by the user. The background pattern is preprogramed into either the flatbed scanners 11, 111, 211 or into the computer. After selection, the computer reproduces the image of the arrangement of the object(s) within the layout area 12, 112, 212 with the background pattern being automatically added. The image and background pattern may then be displayed by the computer on a suitable display device, such as a CRT or a printer. The background pattern may be selected when the user selects or inputs a pattern number or index for retrieving the background pattern into the flatbed scanner 11, 111, 211 via the control panel 21, 121, 221. Alternatively, the user may select the background pattern by inputting an index for retrieving the background pattern into the computer. In yet another alternative embodiment, a bar code (not shown) may be located on the collage making apparatus 10, 110, 210 and be scanned by the scanner 11, 111, 211 so that the background pattern corresponding to that bar code is selected. The background pattern could also be selected by various other suitable methods, as would be obvious to persons having ordinary skill in the art after having become familiar with the teachings of the present invention. In any case, the background pattern is not scanned by the flatbed scanner 11, 111, 211.

It is contemplated that the inventive concepts herein described may be variously otherwise embodied and it is intended that the appended claims be construed to include alternative embodiments of the invention except insofar as limited by the prior art.

What is claimed is:

1. Collage making apparatus for assisting in the production of a collage by duplication apparatus, comprising:

a layout area contained within said collage making apparatus, said layout area accommodating at least one object that is to be contained in said collage, said collage making apparatus being convertible between a layout mode and a duplication mode, said layout area being observable by a user during the layout mode so that the user may observe an arrangement of the at least one object within said layout area, the layout area being reproducible by said duplication apparatus during the duplication mode so that said duplication apparatus produces a copy of the arrangement of the at least one object within said layout area;

a lid operatively associated with said duplication apparatus so that said lid may be moved between an opened position and a closed position, said lid defining said layout area; and a transparent cover member operatively associated with said lid so that said transparent cover member can be moved between a first position and a second position, said transparent cover member exposing said layout area when said transparent cover member is in the first position and when said lid is in the opened position, said transparent cover member covering said layout area when said transparent cover member is in the second position, said transparent cover member also securing the at least one object contained within said layout area when said transparent cover member is in the second position so that said lid may be moved to the closed position without disturbing the arrangement of the at least one object contained in said layout area.

2. The collage making apparatus of claim 1, wherein said transparent cover member comprises a transparent plastic member.

3. The collage making apparatus of claim 1, further comprising a hinge member attached to said lid and to said transparent cover member, said hinge member allowing said transparent cover member to be pivoted with respect to said lid between the first position and the second position.

4. The collage making apparatus of claim 3, wherein said transparent cover member includes a first edge and a second edge, wherein said hinge member pivotally attaches the first edge of said transparent cover member to said lid, and wherein the second edge of said transparent cover member engages said lid when said transparent cover member is in the second position.

5. The collage making apparatus of claim 1, further comprising a transparent backing member operatively associated with said lid so that a space is defined between said transparent backing member and said lid, said space allowing a background motif to be placed between said transparent backing member and said lid.

6. The collage making apparatus of claim 5, wherein said transparent backing member comprises a transparent plastic member.

* * * * *